United States Patent [19]

McLellan

[11] Patent Number: 5,222,708
[45] Date of Patent: Jun. 29, 1993

[54] TRIPOD SAFETY COLLAR

[76] Inventor: Francis McLellan, 1501 Clarence, St. Paul, Minn. 55106

[21] Appl. No.: 536,722

[22] Filed: Jun. 12, 1990

[51] Int. Cl.$^5$ ............................................. A47B 95/00
[52] U.S. Cl. .................................... 248/345.1; 33/299
[58] Field of Search .................... 248/345.1, 177; 206/316.2, 316.1, 305; 150/154, 165, 901; 220/85 K; 33/299, 290; 312/284

[56] References Cited

U.S. PATENT DOCUMENTS

| | | | |
|---|---|---|---|
| 877,796 | 1/1908 | Olson | 312/284 |
| 2,885,821 | 5/1959 | Frick | 248/345.1 |
| 3,016,802 | 1/1962 | Grunenberg | 248/177 |
| 4,162,696 | 7/1979 | Sprung | 206/316.2 |
| 4,503,780 | 3/1985 | Arthur | 248/345.1 |

Primary Examiner—Carl D. Friedman
Assistant Examiner—Korie Chan
Attorney, Agent, or Firm—D. L. Tschida

[57] ABSTRACT

A shock absorbing collar assembly mountable in projecting relation to instrumentation supported from a stand. In one construction, a resilient, annular cushion member and mating rigid cover protect the instrumentation upon stand collapse or tip over. In other constructions, tip detection means release latches secured to various caged spring and pneumatic constructions which resiliently expand to raise a second resilient collar and encase the instrument.

7 Claims, 6 Drawing Sheets

TRIPOD SAFETY COLLAR

BACKGROUND OF THE INVENTION

The present invention relates to safety equipment and, in particular, to a collar for protecting stand supported instrumentation, for example, transits, theodolites, levels, cameras or the like, upon collapse or tip over of the stand.

Surveyors and other individuals involved in large construction projects, commonly are required to transport and portably support rather sophisticated and expensive instrumentation about a construction site. Due to uneven terrain and the general nature of such working conditions, a problem experienced by such individuals is that of periodically having support stands (i.e. tripods) collapse or tip over, with consequent damage to the instrumentation. Often times, rather expensive repair or replacement costs are incurred from such mishaps.

Traditionally, the tripod type stands which are most frequently used to support such instrumentation do not provide a mechanism for minimizing tippage or protecting the supported instrumentation. Except possibly for a ruggedized shock proof housing, the instrumentation also does not provide such protection. The only available alternative therefore to protecting the instrumentation when moving it about a construction site and making multiple measurements is to remove and store the instrumentation in provided carrying cases, with each repositioning. This however can become rather time consuming and tedious.

Most individuals consequently attempt to cut-corners and merely take efforts not to tip the instrumentation. Regardless of such precautions, oftentimes the instrument will still be damaged. For example, even though the user may exert care, other individuals working about the site, may not, which most often is the case and the cause for damage.

With the exception of the foregoing, packing/unpacking and attempts at personal care, Applicant is unaware of any particular device which is transportable with the tripod and assembled instrumentation to protect the instrumentation in the event of the tipping or collapse of the tripod stand.

SUMMARY OF THE INVENTION

It is accordingly a primary object of the present invention to provide a means for protecting delicate stand supported equipment or instrumentation against damage from tip over or collapse.

It is a further object of the invention to provide an assembly including a resilient means which does not obstruct or interfere with normal instrument use, but which cushions any fall of the instrument.

It is a further object of the invention to provide a hardened, removeable housing which encases the instrumentation.

It is a further object of the invention to encase the instrument within a resilient cage, in the event of a fall.

Various of the foregoing objects, advantages and distinctions of the invention are particularly achieved in a preferred embodiment wherein a torroidal collar is concentrically supported relative to the instrument support portion of a tripod. The collar includes a resilient foam, elastomer, hydraulic or pneumatic filler medium to cushion any fall. A rigid cover removably mounts to the collar to encase and protect the instrument during transport.

In various alternative constructions, tip detection apparatus triggers the release of a resilient, spring-assisted upper collar portion. In one construction, the collar assembly comprises a cage including an upper collar portion which rises to substantially surround the instrument in an encased, resilient enclosure. The upright wall portions of the cage can alternatively comprise a number of compressible spring members or a helically wound spring supported between the upper and lower collar portions. In yet another construction, tubular bags coupled to the upper collar fill with a hydraulic medium upon tipping. In still another construction, the torroidal collar is mounted to the tripod with radially projecting springs or shock absorbing arms.

Still other objects, advantages and distinctions of the invention will become more apparent hereinafter upon directing attention to the following description with respect to the appreciated drawings. Before referring thereto, it is to be appreciated the subject disclosure is illustrative only of various presently considered embodiments, along with modifications and improvements thereto, which should not be interpreted in strict limitation of the invention. Rather, the invention should be interpreted within the scope of the following claims.

DESCRIPTION OF THE PREFERRED EMBODIMENT

Figure 1:
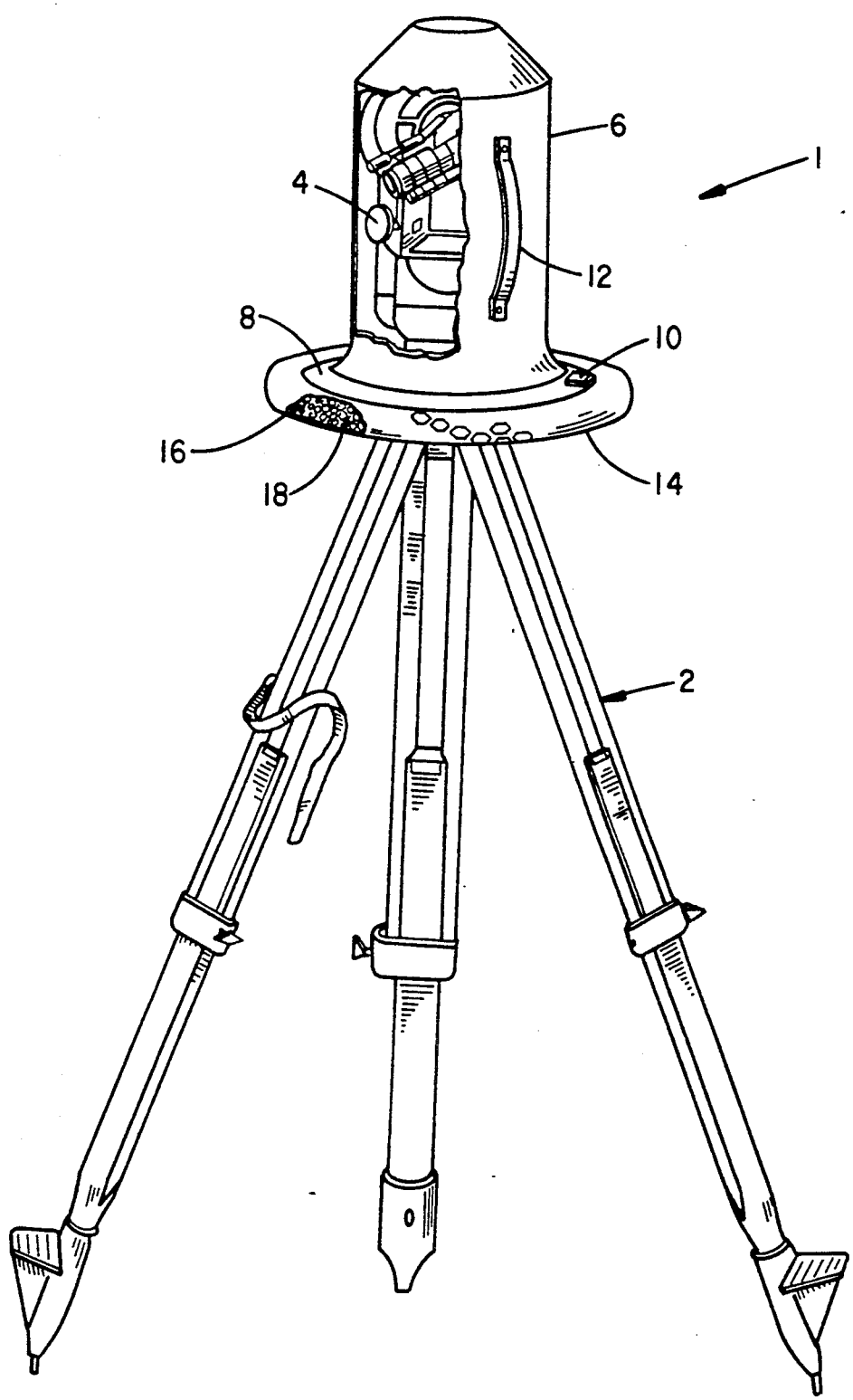
FIG. 1 shows an isometric view of a removeable rigid case construction of the invention in mounted relation to a tripod and wherein various portions are shown in cutaway to elicit further detail.

Referring to FIG. 1, a detailed isometric drawing is shown of one construction of a safety collar assembly 1 of the present invention in assembled relation to a typical tripod assembly 2 and a portion of a supported theodolite 4, which is shown in partial cutaway relative to a rigid cover portion 6 of the collar assembly 1. The cover 6, is constructed to removably mount to an annular collar support portion 8, which is shown in detail in FIG. 2, via a number of clamp fasteners 10 (only one of which is shown for convenience).

The cover 6 is constructed of a molded, hardened material, such as fiberglass, reinforced plastic or blow-molded plastic. It is constructed of a form, size and shape to mount in surrounding relation to not only the theodolite 4, but also other types of surveying/layout instruments, such as transits or sight levels, or any other stand supported equipment. Whereas the cover 6 of FIG. 1 is shown to be of a solid wall construction, it is to be appreciated it can have openings to reduce weight, to provide venting, etc. One of a number of strap handles 12 is also shown which are useful for setting and removing the cover 6 from the collar 8.

The collar portion 8 of the assembly 1 otherwise comprises a torroidal ring 14 which is formed of a resilient, shock absorbing material. As depicted in the cutaway portion of FIG. 1, the present ring 14 is formed of an outer, durable and weather resistant skin portion 16, such as rubber which if filled with a beaded foam filler. Preferably, an additive setting agent is admitted with the foam beads 18 in a slurry form to induce setting of the beads 18 and thereby form a rigid collar interior. Alternatively the beads may be permitted to move about within the outer skin 16, provided a complete fill of the interior cavity is obtained so as to avoid air pockets or cavities which diminish the cushioning value of the collar.

The diameter of the ring 14 is such that is extends beyond the instrument 4 approximately two to six inches. The specific dimensions can be varied depending upon the instrument 4, but generally the ring 14 will at least partially protect the instrument 4, even if the cover 6 is not in position.

In alternative constructions of the torroidal ring 14, it can either be formed in the above rigid configuration or can be filled with water, oil, air or some other hydraulic or pneumatic medium which can be admitted upon assembly or upon sensing a tip condition via a fill tube (not shown). For such constructions, however, concern must be given to the wearability of the assembly and typically encountered conditions, since with temperature extremes a hydraulic medium may expand or contract or leak. It is to be further appreciated that although a torroidal ring 14 is shown, alternatively a flat disk or a number of radially extending projections can be used, provided they are rigid enough to support the weight of the tripod 2 and instrument 4 and without collapsing upon impact.

Figure 2:
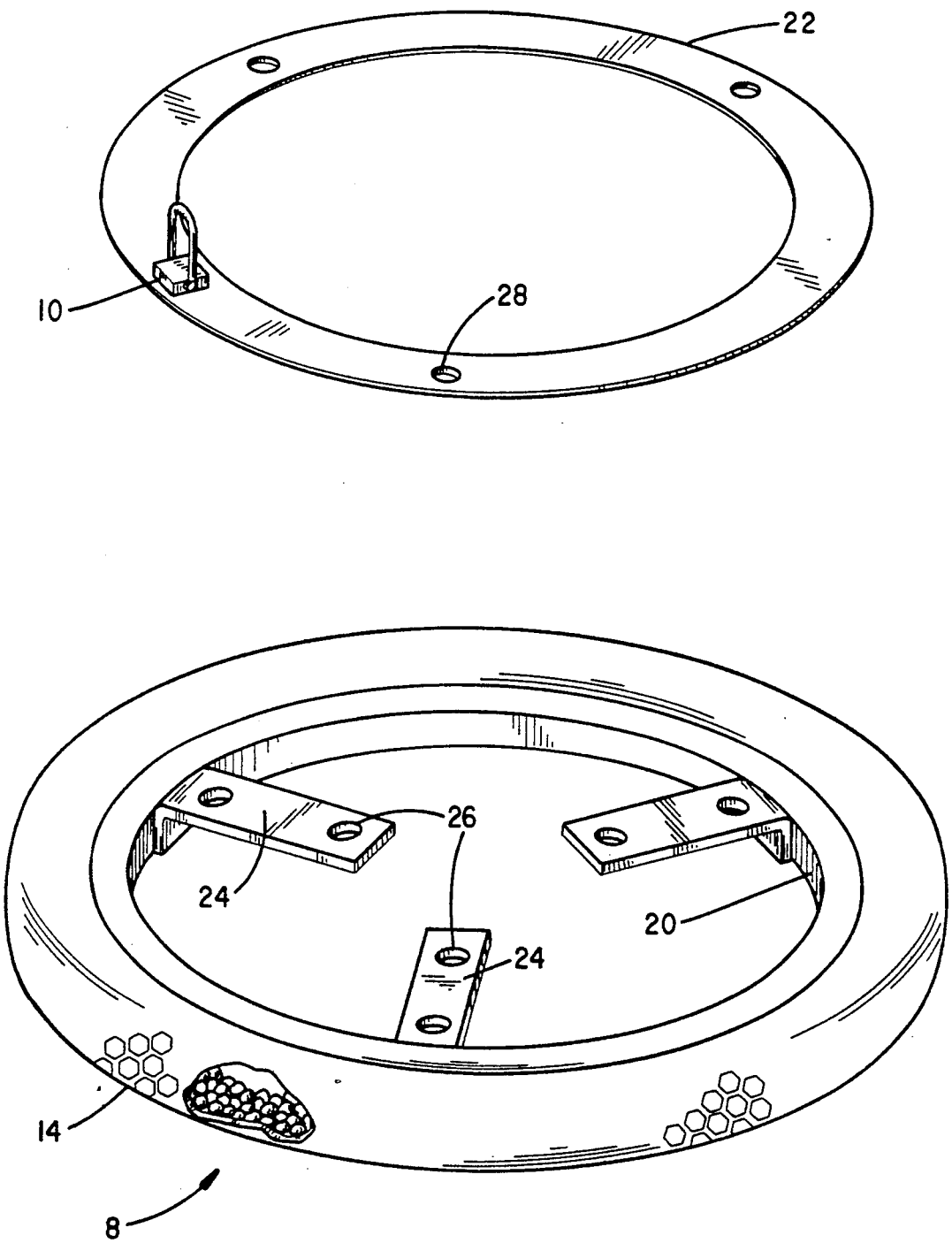
FIG. 2 shows an exploded assembly view of the lower collar and housing attachment ring of FIG. 1.

Referring to FIG. 2, an exploded view is shown of the collar portion 8, which includes an inner rim member 20 and an overlying annular disk 22 that supports the cover clamps 10. A plurality of arms 24 radially project from the rim 20 and include associated mounting holes 26. The holes 26 align with holes 28 in the disk 22 and whereat suitable fasteners secure the collar portion 8 to the instrument mounting plate (not shown) of the tripod 2. With such a mounting, a centered, captured attachment screw, which is normally provided with the instrument mounting plate, secures the instrument 4 to the tripod 2. The instrument 4 is thus independently secured in conventional fashion, while the collar portion 8 is semi-permanently coupled to the tripod 2. The cover 6, in turn, is mountable or not to the disk 22.

In an alternative construction to that of FIG. 2, the radial arms 24 can mount to an annular washer or other mechanism, which rests on the instrument mounting plate and which is restrained thereto, upon mounting the instrument and tightening the provided attachment screw. In still another construction, it is contemplated that springs or extensible/retractable arms (not shown) might be substituted for the rigid arms 24 to provide additional shock absorption.

While the collar assembly 1 of FIGS. 1 and 2 has proven effective for minimizing instrument damage, FIGS. 3 through 6 show still other alternative constructions which do not require a rigid cover 6. Instead they provide for extendible cage portions 30, including a second annular collar 32. Upon the detection of a tip condition, the second collar particularly expands to encase and cushion the instrument 4.

Figure 3:
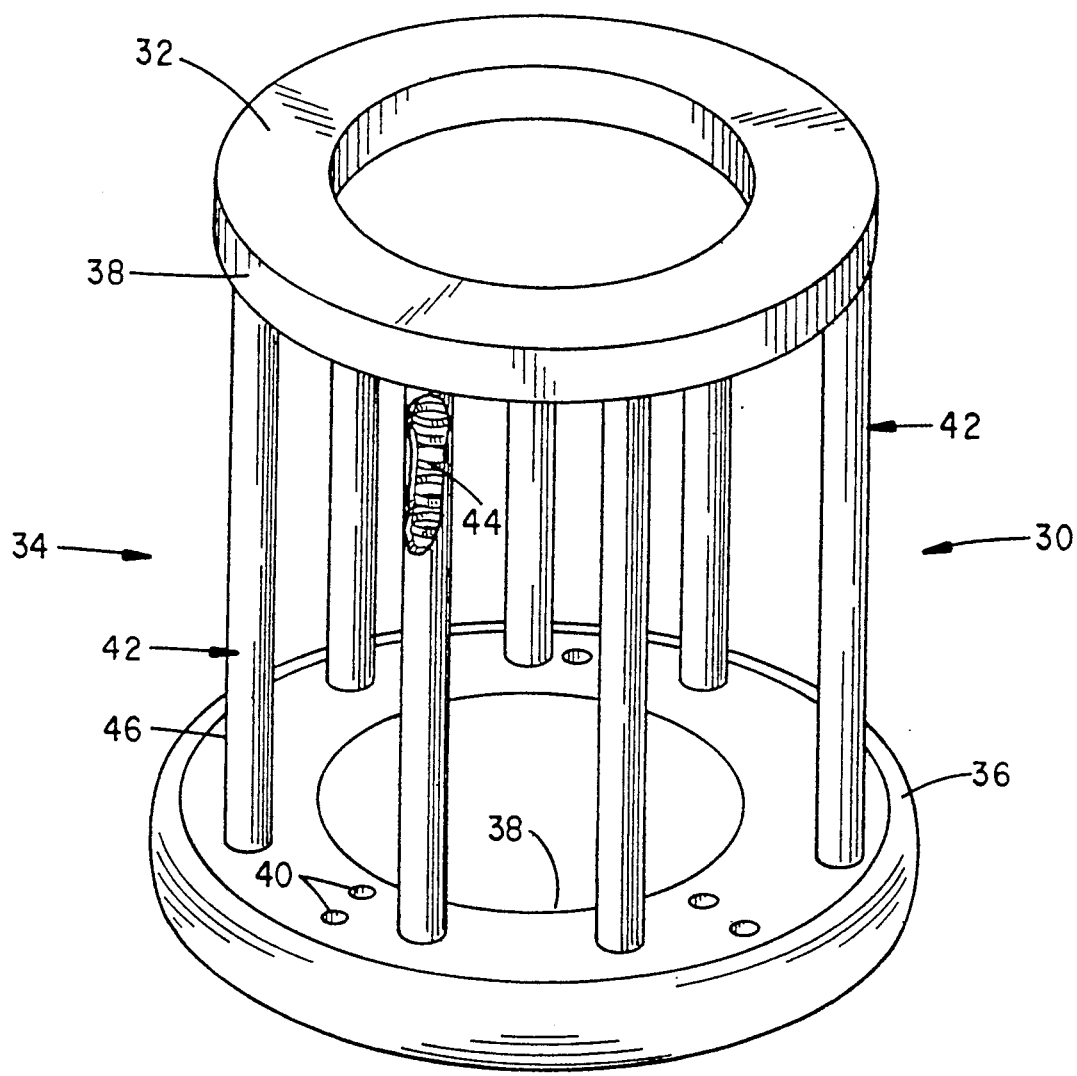
FIG. 3 shows a spring biased multi-collared assembly.

With reference to FIG. 3, a safety collar assembly 34, is disclosed including upper and lower torroidal support portions 32 and 36. The upper portion 32 substantially comprises a semi-rigid, resilient annulus and from which a skirt 38 downwardly projects. The lower collar 36 comprises an equivalent assembly to that of the ring 14 and whereto a plate 38 including a number of mounting holes 40 is secured. Coupled between the plate 38 and the upper portion 32 are a plurality of confined spring members 42 which are biased to induce a separated mounting between the upper and lower collar portions 32, 36, with the upper collar being positioned along the height of the instrument 4.

In normal application, the upper and lower collar portions 32, 36 are compressed to each other with a triggered latch (reference FIG. 6) being set to secure the portions together. The spring members 42 are normally hidden by the skirt 38 when compressed. Each spring member 42 otherwise comprises a spiral spring 44 which is confined within a tube 46 or via some other mechanism for substantially limiting lateral movement of the spring 44.

Figure 6:
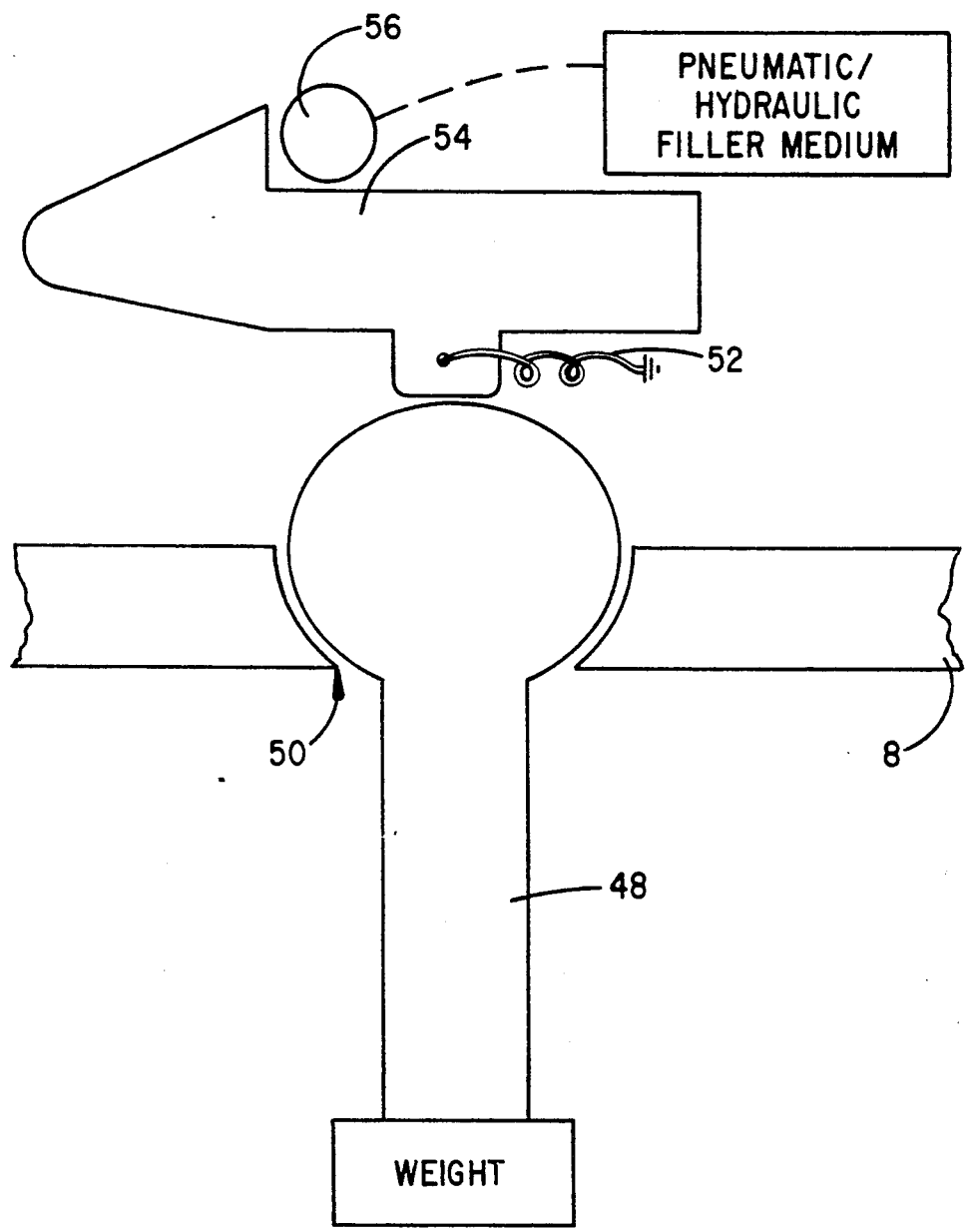
FIG. 6 shows a tip detector and latch/pneumatic assembly.

With reference to FIG. 6, upon detecting a tip over condition via movement of a weighted pendulum member 48, which mounts to the collar portion 8 and a provided ball-and-socket coupler 50, a spring 52 biased latch 54 releases from a catch pin 56 to allow the upper and lower collar portions to separate and encase the instrument. Although FIG. 6 diagrammatically depicts one type of tip detector/latch assembly, a variety of level sensitive mechanisms can be employed to effect a latched release of the upper and lower portions 32, 36. Depending upon the construction, multiple latches might also be required to detect all possible tip conditions.

Figure 4:
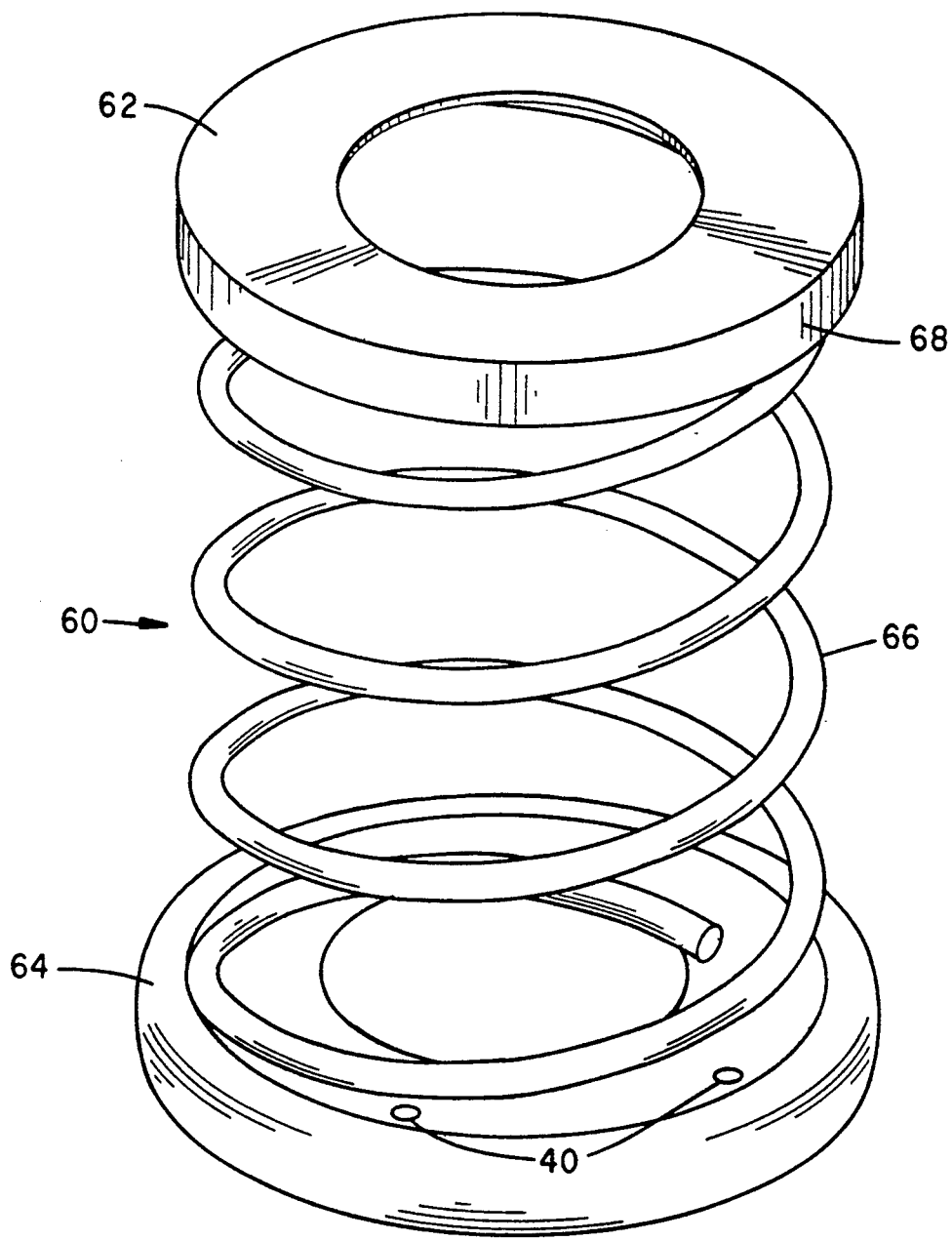
FIG. 4 shows a two-part collar interconnected with a helical spring.

Referring to FIG. 4, yet another two-part collar assembly 60 is disclosed including upper and lower collar portions 62, 64. In lieu of a number of springs 42, a single helically wound spring 66 interconnects the collar portions 62, 64 and operates in a similar fashion to the assembly 34 of FIG. 3. The upper collar portion 62, again, includes an annular skirt which encases the helical spring 66, when compressed.

Figure 5:
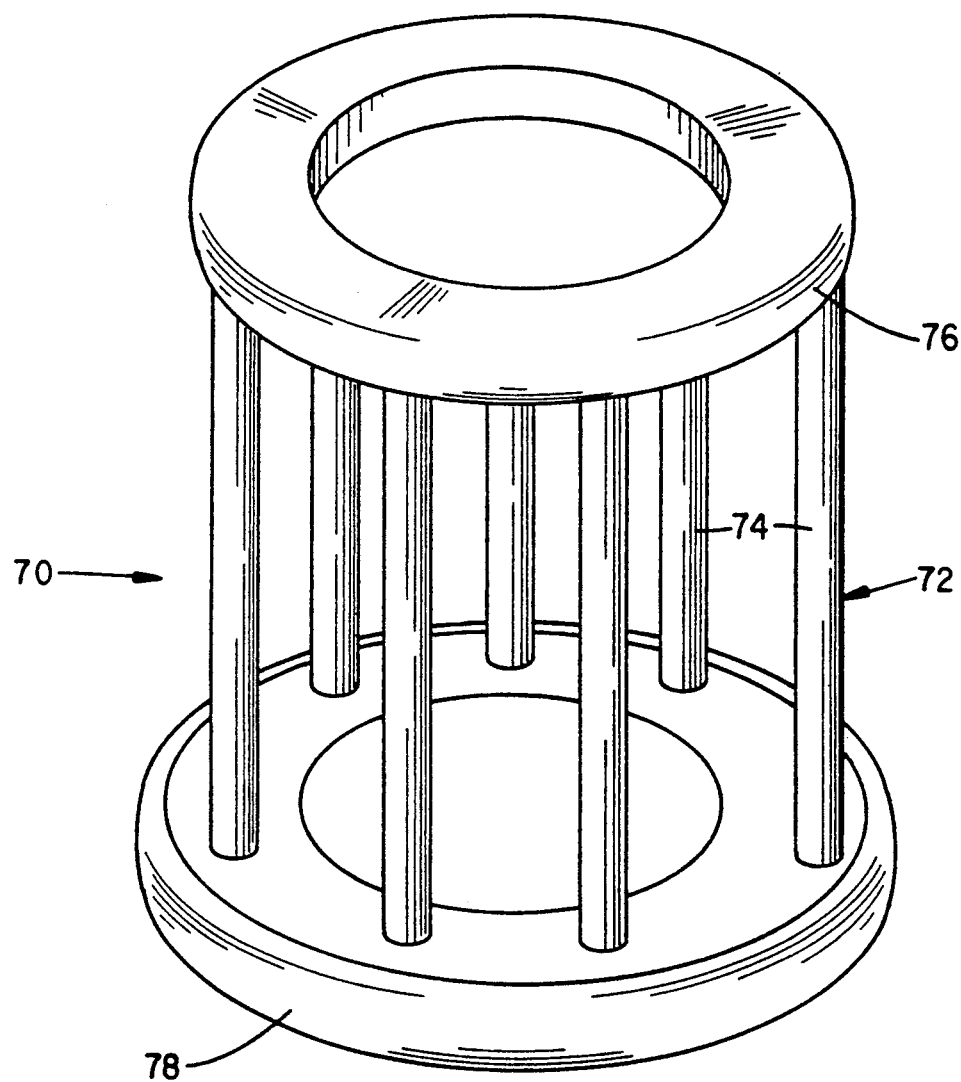
FIG. 5 shows a pneumatic, multi-collared assembly which encases the instrument, upon tipping.

Referring lastly to FIG. 5, yet another expandable collar assembly 70 of a hydraulic construction is disclosed. It comprises a lower collar portion 72 which is secured to the tripod 2 and to which an air-filled expandable portion 72, including a vertical tubing section 74 secured to an upper collar portion 76. The inflatable portion 72 is attached in removable relation to the lower collar portion 78 should it be necessary to repair or replace the inflatable portion 72. For this assembly 70 and upon release of the latch 54 of FIG. 6, an associated puncture mechanism induces the release of a pre-charged gas or hydraulic medium from a container which mounts to the tripod 2. For example, one or more $CO_2$ cartridges can be employed to this end. Upon the release of the gas, the collar portion 72 inflates to protect the instrument. A valve stem (not shown) may be used to vent the gas and per re-compressing the portion 72, during a re-setting of the portion 72.

While the subject invention has been described with respect to various presently and alternatively considered constructions, along with various modifications and improvements thereto, it is to be appreciated that those of skill in the art may arrive at still other constructions. Accordingly, it is contemplated that the following claims should be interpreted to include all those equivalent embodiments within the spirit and scope thereof.

What is claimed is:

1. Protection apparatus in combination with shock sensitive instrumentation and a support stand comprising annular collar means for absorbing shock, said annular collar including a cavity filled with a resilient deformable medium and means for securing said collar means to the support stand to circumscribe the shock sensitive instrumentation which is rigidly secured to the stand and such that in the event of a collapse of the stand portions of said collar means deform to absorb shock and protect the instrumentation.

2. Apparatus as set forth in claim 1 wherein said medium comprises a slurry of foam particles.

3. Apparatus as set forth in claim 1 wherein said collar means includes a cover having one or more rigid portions mountable about said instrumentation and means for removably coupling said cover to said collar means.

4. Protection apparatus in combination with shock sensitive instrumentation and a support stand comprising:
    (a) an annular collar including a resiliently deformable portion; and
    (b) means for securing said collar to the support stand in a plane orthogonal to the stand and in substantial concentric relation to instrumentation which is rigidly secured to the stand and such that in the event of the collapse of the stand, portion of said collar means deform to absorb shock and prevent the instrumentation from striking the ground; and
    (c) a cover having one or more rigid portions which mount about the instrumentation and means for detachably coupling the cover to said collar.

5. Apparatus as set forth in claim 4 wherein said collar means includes a torroidal member having an interior cavity and wherein said cavity is filled with a resiliently deformable medium.

6. Protection apparatus in combination with shock sensitive instrumentation and a support stand comprising:
    a) collar means for resiliently deforming to absorb shock;
    b) means for securing said collar means to the support stand to substantially circumscribe the instrumentation which is rigidly secured to the stand and such that in the event of a collapse of the stand, portions of said collar means deform upon striking a hardened surface to absorb shock and protect the instrumentation; and
    c) a cover having one or more rigid portions mountable about said instrumentation and means for removably coupling said cover to said collar means.

7. Apparatus as set forth in claim 6 wherein said stand comprises a tripod.

* * * * *